(12) United States Patent
Paine

(10) Patent No.: US 10,728,261 B2
(45) Date of Patent: Jul. 28, 2020

(54) SYSTEM AND METHOD FOR CYBER SECURITY THREAT DETECTION

(71) Applicant: ResponSight Pty Ltd, Melbourne, Victoria (AU)

(72) Inventor: Jeffrey Paine, Melbourne (AU)

(73) Assignee: ResponSight Pty Ltd, Melbourne, Victoria (AU)

( * ) Notice: Subject to any disclaimer, the term of this patent is extended or adjusted under 35 U.S.C. 154(b) by 223 days.

(21) Appl. No.: 15/699,777

(22) Filed: Sep. 8, 2017

(65) Prior Publication Data
US 2018/0255077 A1 Sep. 6, 2018

Related U.S. Application Data

(60) Provisional application No. 62/466,279, filed on Mar. 2, 2017.

(51) Int. Cl.
*G06F 21/55* (2013.01)
*G06F 21/57* (2013.01)
(Continued)

(52) U.S. Cl.
CPC .......... *H04L 63/1416* (2013.01); *G06F 21/55* (2013.01); *G06F 21/552* (2013.01);
(Continued)

(58) Field of Classification Search
CPC ............ H04L 63/1416; H04L 63/1425; H04L 63/1433; H04L 63/145; H04L 63/1466; H04L 63/20
(Continued)

(56) References Cited

U.S. PATENT DOCUMENTS 6,405,318 B1 6/2002 Rowland
7,124,438 B2 10/2006 Judge et al.
(Continued)

FOREIGN PATENT DOCUMENTS

WO  WO-2016/138067  9/2016

OTHER PUBLICATIONS

"International Search Report and Written Opinion of the International Searching Authority dated May 30, 2018; International Application No. PCT/IB2018/000396", dated May 30, 2018.
(Continued)

*Primary Examiner* — Farid Homayounmehr
*Assistant Examiner* — Thanh T Le
(74) *Attorney, Agent, or Firm* — Womble Bond Dickinson (US) LLP

(57) ABSTRACT

A cyber security threat detection system for one or more endpoints within a computing environment is disclosed. The system includes one or more collector engines. Each of the collector engines includes a service and an agent operating on a corresponding system endpoint of the system endpoints. The service is configured to take a first snapshot of the corresponding system endpoint. The first snapshot includes event activity information associated with the system endpoint. The agent is configured to take a second snapshot of the corresponding system endpoint. The second snapshot includes behavioral activity information associated with the corresponding system endpoint. The system further includes an aggregator engine configured to aggregate the first snapshot and the second snapshot from each of the system endpoints into an aggregated snapshot. The system further includes one or more analytics engines configured to: generate and store baseline profiles associated with the system endpoints based on a previously received aggregated snapshot, receive the aggregated snapshot from the aggre-
(Continued)

gator engine, determine deviation values for each of the system endpoints based on the received aggregated snapshot and the stored baseline profiles, and generate, for each of the system endpoints, a cumulative risk value based on the deviation values. The system further includes one or more alerting engines configured to determine whether to issue one or more alerts indicating one or more security threats have occurred for each of the endpoints in response to the cumulative risk value.

16 Claims, 10 Drawing Sheets

(51) Int. Cl.
  *H04L 29/06* (2006.01)
  *H04L 29/08* (2006.01)
(52) U.S. Cl.
  CPC ............ *G06F 21/554* (2013.01); *G06F 21/57* (2013.01); *H04L 63/145* (2013.01); *H04L 63/1425* (2013.01); *H04L 63/1433* (2013.01); *H04L 63/1466* (2013.01); *H04L 63/20* (2013.01); *G06F 2221/034* (2013.01); *H04L 63/18* (2013.01); *H04L 67/10* (2013.01); *H04L 2463/141* (2013.01)
(58) Field of Classification Search
  USPC ......................................................... 726/22
  See application file for complete search history.

(56) References Cited

U.S. PATENT DOCUMENTS

| | | | |
|---|---|---|---|
| 7,475,405 B2 | 1/2009 | Manganaris et al. | |
| 7,779,466 B2 | 8/2010 | Judge et al. | |
| 8,230,505 B1 | 7/2012 | Ahrens et al. | |
| 8,280,833 B2 | 10/2012 | Miltonberger | |
| 8,489,635 B1* | 7/2013 | Phoha .................... | G06F 21/316 707/781 |
| 8,490,197 B2 | 7/2013 | Herz | |
| 8,555,385 B1* | 10/2013 | Bhatkar ................. | G06F 21/556 726/22 |
| 8,621,629 B2 | 12/2013 | Evans et al. | |
| 8,631,496 B2 | 1/2014 | Dequevy | |
| 8,739,281 B2 | 5/2014 | Wang et al. | |
| 8,813,236 B1 | 8/2014 | Saha et al. | |
| 8,938,805 B1 | 1/2015 | Juels et al. | |
| 9,177,139 B2 | 11/2015 | Hull Roskos | |
| 9,197,652 B2 | 11/2015 | Busser et al. | |
| 9,225,730 B1* | 12/2015 | Brezinski ............... | G06F 21/00 |
| 9,231,964 B2 | 1/2016 | Cross et al. | |
| 9,323,930 B1 | 4/2016 | Satish | |
| 9,350,748 B1 | 5/2016 | McClintock et al. | |
| 9,350,750 B1 | 5/2016 | Aval et al. | |
| 9,600,659 B1* | 3/2017 | Bird ....................... | G06F 21/50 |
| 2002/0082886 A1* | 6/2002 | Manganaris .......... | G06F 21/552 719/318 |
| 2003/0172302 A1 | 9/2003 | Judge et al. | |
| 2005/0001717 A1 | 1/2005 | Bohbot et al. | |
| 2006/0075128 A1* | 4/2006 | Kotler ................... | H04L 63/102 709/229 |
| 2007/0174910 A1* | 7/2007 | Zachman ................ | G06F 21/53 726/18 |
| 2007/0195753 A1 | 8/2007 | Judge et al. | |
| 2009/0216679 A1* | 8/2009 | Yeap ....................... | G06F 21/43 705/71 |
| 2010/0263049 A1 | 10/2010 | Cross et al. | |
| 2011/0107418 A1* | 5/2011 | Bhagwan .............. | G06F 21/604 726/22 |
| 2011/0107419 A1* | 5/2011 | Vidal ...................... | G06F 21/55 726/22 |
| 2012/0054866 A1 | 3/2012 | Evans et al. | |
| 2012/0069131 A1* | 3/2012 | Abelow ............... | G06Q 10/067 348/14.01 |
| 2012/0102570 A1 | 4/2012 | Herz | |
| 2012/0198277 A1 | 8/2012 | Busser et al. | |
| 2012/0297489 A1 | 11/2012 | Dequevy | |
| 2013/0097701 A1* | 4/2013 | Moyle ................... | G06F 21/552 726/22 |
| 2013/0145465 A1 | 6/2013 | Wang et al. | |
| 2013/0246605 A1* | 9/2013 | Mahadik ............. | H04L 63/1433 709/224 |
| 2014/0189860 A1 | 7/2014 | Hull Roskos | |
| 2014/0281645 A1 | 9/2014 | Sen et al. | |
| 2014/0282964 A1 | 9/2014 | Stubblefield | |
| 2015/0222656 A1* | 8/2015 | Haugsnes ............... | G06F 16/24 726/23 |
| 2015/0310196 A1* | 10/2015 | Turgeman ............. | G06F 21/552 726/19 |
| 2015/0340376 A1* | 11/2015 | Park ................... | H01L 27/11582 257/329 |
| 2015/0341376 A1* | 11/2015 | Nandy ................ | H04L 63/1408 726/23 |
| 2016/0078365 A1 | 3/2016 | Baumard | |
| 2016/0110551 A1* | 4/2016 | Fugate ................... | G06F 3/015 726/25 |
| 2016/0117498 A1* | 4/2016 | Saxena ................... | G06F 21/57 726/23 |
| 2016/0196454 A1* | 7/2016 | Soffer ................... | H01R 13/443 726/16 |
| 2016/0205116 A1* | 7/2016 | Sang ....................... | G06F 21/53 726/25 |
| 2016/0234251 A1 | 8/2016 | Boice et al. | |
| 2016/0294837 A1* | 10/2016 | Turgeman ............. | G06F 21/316 |
| 2016/0359872 A1 | 12/2016 | Yadav et al. | |
| 2016/0381030 A1* | 12/2016 | Chillappa ............. | H04L 63/102 726/11 |
| 2017/0006051 A1* | 1/2017 | Gould .................. | H04L 63/1425 |
| 2017/0140154 A1 | 5/2017 | Carpenter et al. | |
| 2017/0201542 A1 | 7/2017 | Kim et al. | |
| 2017/0208086 A1 | 7/2017 | Carpenter et al. | |
| 2017/0237764 A1* | 8/2017 | Rasumov ............. | H04L 63/1483 726/25 |
| 2017/0279826 A1* | 9/2017 | Mohanty ............. | G06F 9/45558 |
| 2017/0295188 A1* | 10/2017 | David ................. | H04L 63/0428 |
| 2017/0339166 A1 | 11/2017 | Althouse et al. | |
| 2017/0339178 A1* | 11/2017 | Mahaffey ............. | G06F 11/3072 |
| 2017/0359308 A1* | 12/2017 | Pal ...................... | H04L 63/0281 |
| 2018/0013722 A1* | 1/2018 | Enos ................... | H04L 63/0823 |
| 2018/0025149 A1* | 1/2018 | Watson ................. | H04L 9/3271 726/2 |
| 2018/0026944 A1* | 1/2018 | Phillips ............... | H04L 63/0263 726/4 |
| 2018/0075234 A1 | 3/2018 | Boutnaru | |
| 2018/0075239 A1 | 3/2018 | Boutnaru | |
| 2018/0077187 A1* | 3/2018 | Garman ................ | G06F 16/951 |
| 2018/0124094 A1* | 5/2018 | Hamdi ...................... | G06F 7/24 |
| 2018/0124984 P1 | 5/2018 | Suphachadiwong | |
| 2018/0191763 A1* | 7/2018 | Hillard ................ | H04L 63/1425 |
| 2018/0241731 A1* | 8/2018 | Guo ........................ | H04L 67/34 |
| 2018/0309770 A1* | 10/2018 | Han ........................ | G06F 9/455 |
| 2019/0121956 A1* | 4/2019 | Turgeman ............... | G06F 21/45 |

OTHER PUBLICATIONS startupdaily.net, "Melbourne startup ResponSight looks at behavioural analytics to detect security breaches within organisations", http://www.startupdaily.net/2016/01/melbourne-startup-responsight-looks-behavioural-analytics-detect-security-breaches-within-organisations/, Jan. 15, 2016, pp. 1-3.

"Notice of Allowance dated Feb. 28, 2020, U.S. Appl. No. 15/811,385", dated Feb. 28, 2020.

"Office Action dated Dec. 16, 2019; U.S. Appl. No. 15/699,765", dated Dec. 16, 2019.

"Office Action dated Sep. 17, 2019; U.S. Appl. No. 15/811,385", dated Sep. 17, 2019.

(56) References Cited

OTHER PUBLICATIONS

"Office Action dated Sep. 19, 2019; U.S. Appl. No. 15/905,686", dated Sep. 19, 2019.

* cited by examiner

SYSTEM AND METHOD FOR CYBER SECURITY THREAT DETECTION

CROSS REFERENCE TO RELATED APPLICATIONS

This application claims the benefit of U.S. Provisional Application No. 62/466,279 filed on Mar. 2, 2017, the disclosure of which is incorporated by reference herein.

FIELD OF THE INVENTION

Embodiments of the present invention relate generally to security systems. More particularly, embodiments of the invention relate to system and method for cyber security threat detection.

BACKGROUND

The significant growth in frequency and severity of cyber-attacks has highlighted the failure of traditional security systems in combatting the threat of modern and advanced cyber adversaries. Organizations are increasingly recognizing the need for improved cybersecurity systems to combat cyber-attacks and this is driving significant growth in the already large cyber security industry which is predicted by market analysts to represent a US$170B global market opportunity by 2020. Endpoint security is a specific problem within the cyber security industry and currently represents a US$20.9B global market opportunity.

The Problem: Cyber Security—Growth in Frequency and Severity of Cyber Attacks

Modern attackers have adopted new tactics, techniques and procedures to circumvent the traditional security controls of organizations, leading to a significant increase in the incidence and severity of cyber-attacks. FIG. 1a shows bar graphs demonstrating the increase in the number of global security incidents 102 between 2009 and 2015. Overall, this indicates a 61% CAGR in the number of security incidents over that time. FIG. 1b shows bar graphs indicative of the average total cost 104 of a single data breach for an organization in the USA between 2013 and 2015. Note that this rising cost has close to a 10% CAGR producing a $6.53 million average cost 106 in 2015 for just one data breach at a typical organization.

Although organizations have recognized the importance of preventing cyber attacks, their reliance on traditional security systems have left them vulnerable. Legacy security systems are ineffective at identifying legitimate threats and often produce large volumes of alerts which lead to false positives (normal or expected behaviors that are identified as anomalous or malicious). As such, IT administrators within organizations do not have the necessary resource (personnel) or computational bandwidth to assess all alerts which often leads to legitimate threats going undetected. As a result of ineffective flagging and detection systems, organizations at the present time are taking an average of 146 days to detect a data breach. Whilst an initial breach on day 1 can result in a minor security incident, the longer a breach remains undetected the higher the chance of a major data breach.

A Specific and Major Problem: Endpoint Security Risk—Breaches at the Endpoint are a Significant Challenge for Organizations The implementation of strong endpoint security is critical as endpoints (e.g. computers and mobile devices such as smartphones and tablets) provide the gateways through which users (and potential attackers) can gain access to highly sensitive corporate or government data. Most of the biggest data breaches, judged by the number of records beached or importance of data stolen, have involved attackers leveraging stolen employee credentials to gain access to secured networks via endpoints. The significant growth in Bring Your Own Device ('BYOD') and Internet of Things ('IoT') have further compromised the endpoint security of organizations as they no longer have control over the type or number of endpoints devices available to an end user.

An organization's approach to endpoint security, and cyber security threats generally, can be broken down into two categories: a) prevention, and b) detection and response (comparable to a strong preventative gate vs. an alarm system on a house). Traditional endpoint prevention, detection and response systems rely on pre-determined threat indicators to block and detect specific threats, whereas modern cyber attacks are using advanced techniques to circumvent these pre-determined criteria. Despite the growing endpoint security threat, there remains a fundamental difference between the way in which a hacker or an employee would operate a particular endpoint.

Thus, there is a need for a behavioral based endpoint security solution that can detect anomalies in user behavior to accurately identify all threats and breaches (regardless of the cause or effect) at endpoints without the limitations of specific pre-determined criteria.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1B:
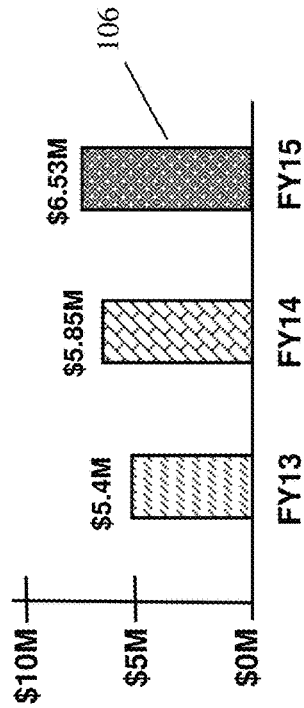
FIG. 1b shows bar graphs indicative of the average total cost of a data breach for an organization in the USA between 2013 and 2015.
Figure 1A:
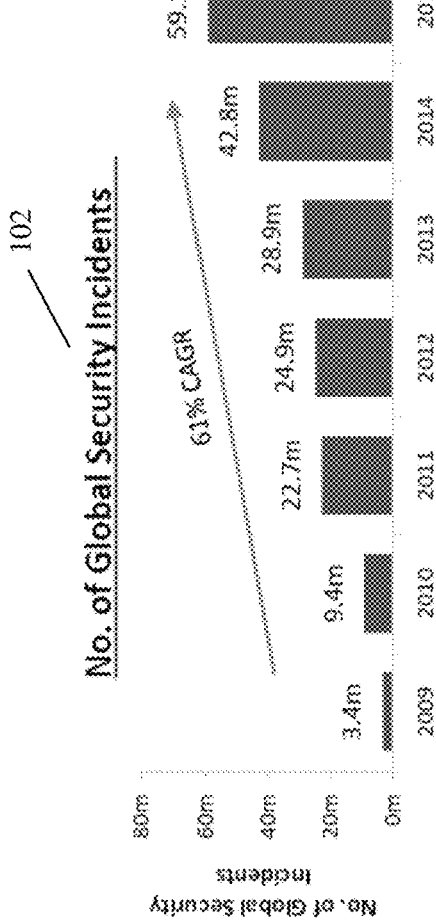
FIG. 1a shows bar graphs demonstrating the increase in the number of global security incidents between 2009 and 2015.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

Terminology

Aggregator—A technology that acts as a centralized connection target in enterprise networks where individual endpoints are not permitted to connect to the Internet (usually) due to corporate policy. The Aggregator also simplifies integration with existing security, monitoring and alerting technologies, and reduces complexity during implementation.

API—Application Programming Interface allows applications and services to communicate without an interactive interface (e.g., graphical user interface (GUI) or web browser).

Bot (Robot)—A Bot is a distributed technology used by attackers to automate their activities on a large scale. Often assembled into "BotNets" or "Zombie Networks", these are large groups of infected or breached endpoints that are collectively used to do various attacker activities. Examples include automated attack of non-infected endpoints; harvesting of private, sensitive or financial information (such as credit card numbers or usernames/pas swords). Bots are identifiable by their behavior, which is highly automated and high speed. Keystrokes tend to be consistently timed and error free, and mouse movements tend to be perfectly straight with very little acceleration/deceleration/dwell in the movement. Bots are also heavy users of keyboard shortcuts and CMD/terminal sessions to execute strings of commands in sequence.

Collector—Endpoint technology functions as an operating system service and user agent, designed to snapshot and collect statistical event information from the endpoint. Examples of statistical information include number of central processing unit (CPU) processes, or size of memory footprint, or network data transmit and receive counters. The Collector does not collect any private or sensitive data of any kind, and hashes (encrypts) collected data before delivery to the cloud analytics services to further ensure no private or sensitive data is recorded and stored.

Endpoint—Any device that is in the control of a user (employee/staff member/contractor/etc.) and is used for the performance of organization functions that require access to corporate systems. In many cases, endpoints are simply PC desktops and laptops, usually running Microsoft or Apple operating systems. Endpoints can also include mobile devices (smart phones and tablets), and Internet of Things (IoT) devices such as cameras and medical equipment.

Enterprise—An "enterprise" can be the entire organization/company, or it can also mean a division/department/business unit inside the organization/company. Therefore, a single enterprise is the collection of users and endpoints that operate as a cohesive and integrated unit, either as the superset that is the entire organization, or a subset. Note also that the emphasis can also be placed on "inside"—many existing technologies are based on a design assumption that breach activity only occurs inside the corporate network perimeter. Moreover, breaches may happen wherever the user and endpoint is operating, including out on the Internet, outside the protection of the traditional enterprise network.

Security Incident and Event Monitoring (SIEM)—SIEM is generally in the form of a large, expensive centralized system that takes disparate activity logging sources (such as Active Directory, proxies, firewalls, etc.) and performs analytics in order to determine threats in a corporate computing environment.

Endpoint Access Behavioral Activity—The behavior of a user during accessing the system via an endpoint that comprises all user activity relating to, but not limited to, firewall, IP address, activity counter, process info, downloads, keyboard, mouse etc.

Systems and methods are provided for collection and aggregation of raw statistical data from system access endpoints to identify typical behavior of approved users and subsequently determine behavior changes indicating endpoint compromise. A data collector engine resides on each physical endpoint and captures user endpoint access behavioral activity data such as for example firewall, IP address, activity counter, process info, keyboard connections and activations, mouse telemetry, and user activity telemetry. Captured data is then securely sent to a cloud-based analysis platform to determine an approved user's behavioral profile (or fingerprint) that encompasses individual metrics, activity sequences, and comparative (historical) data. The behavioral profile is then compared to future user activity to identify irregular behaviors, and IT administrators are then alerted by reporting and alerting engines to any credible potential threats. The cloud based analysis platform includes behavioral and metrics analytics engines that use rules and learning systems to differentiate between different users, including approved users, attackers, and malware. Also included is a User Interface dashboard for handling alerts, and also a Prediction Engine to assist in discovering threats and attackers through a process including establishing probabilistic trends for software activity and using these trends to determine abnormal activity.

The cyber security technology is disclosed that creates a profile or 'fingerprint' of an authorized user based on the way they historically use endpoint devices (for example through applications that are installed and used common to that particular user, keyboard timing (strokes or errors per minute) or mouse usage patterns) and compares that to what is actually occurring in real time to detect and flag potential breaches. The profile is constructed using numerical (non-sensitive) data from multiple user-specific behavioral metric groups. The cyber security technology can be integrated, for example, into an organization's existing security systems to enhance threat detecting and flagging capabilities whilst reducing the risk of false positives.

User specific behavioral analysis extends beyond traditional threat detection techniques—that are easily circumvented by modern cyber-adversaries—to accurately detect abnormal behaviors that are indicative of breaches. User behaviors may be observed over time and baseline profiles are created. Baseline profiles are updated after analysis of captured data is complete, i.e. a profile is adjusted according to activities and metrics that represent changes in normal behavior over time. The adjustment process is scaled (i.e. the new behaviors must continue to exist over time in order to be built into the profile. By updating the profile only based on continued activity over time, and within other parameters (i.e. time of day, etc.), the risk that attacker behaviors become part of a normal profile may be avoided.

According to one aspect of the invention, a cyber security threat detection system for one or more endpoints within a computing environment is disclosed. The system includes one or more collector engines. Each of the collector engines includes a service and an agent operating on a corresponding system endpoint of the system endpoints. The service is configured to take a first snapshot of the corresponding system endpoint. The first snapshot includes event activity information associated with the system endpoint. The agent is configured to take a second snapshot of the corresponding system endpoint. The second snapshot includes behavioral activity information associated with the corresponding system endpoint. The system further includes an aggregator engine configured to aggregate the first snapshot and the second snapshot from each of the system endpoints into an aggregated snapshot. The system further includes one or more analytics engines configured to: generate and store baseline profiles associated with the system endpoints based on a previously received aggregated snapshot, receive the aggregated snapshot from the aggregator engine, determine deviation values for each of the system endpoints based on the received aggregated snapshot and the stored baseline profiles, and generate, for each of the system endpoints, a cumulative risk value based on the deviation values. The system further includes one or more alerting engines configured to determine whether to issue one or more alerts indicating one or more security threats have occurred for each of the endpoints in response to the cumulative risk value.

Behavioral Profile

One exemplary embodiment of the invention captures numerical data on at least 7 exemplary user-specific behavioral metric groups to identify a user's behavioral profile—the unique way that a user interacts with their device. An example of the behavioral data collected from the keyboard is key strokes per minute—see Table 1. This methodology can be extended to collect data on up to 75 or more metric groups. Additionally, proprietary algorithms may be used to overlay actual user endpoint activity with the expected behavioral profile to detect threats and breaches. Such methodology may be integrated into a customer organization's existing security systems to enhance breach detection and flagging capabilities. As the platform requires minimal CPU usage, its implementation will not impact the end user's experience at a customer organization.

System Overview

When incorporated into a commercial or government enterprise computer system, raw statistical data from computer endpoints may be collected in order to analyze patterns and sequences that provide 3 key outcomes:

a) Identify and differentiate between users of the endpoint, without needing to identify them by name/username/account (i.e. observe that "person x" is the usual user of the endpoint without ever knowing who "person x" is);

b) Identify changes in user behavior on the endpoint, that might suggest account or endpoint compromise; and c) Reduce the average time taken to detect such compromises from the current average of 146 days to a time more functionally useful (minutes/hours).

Figure 2:
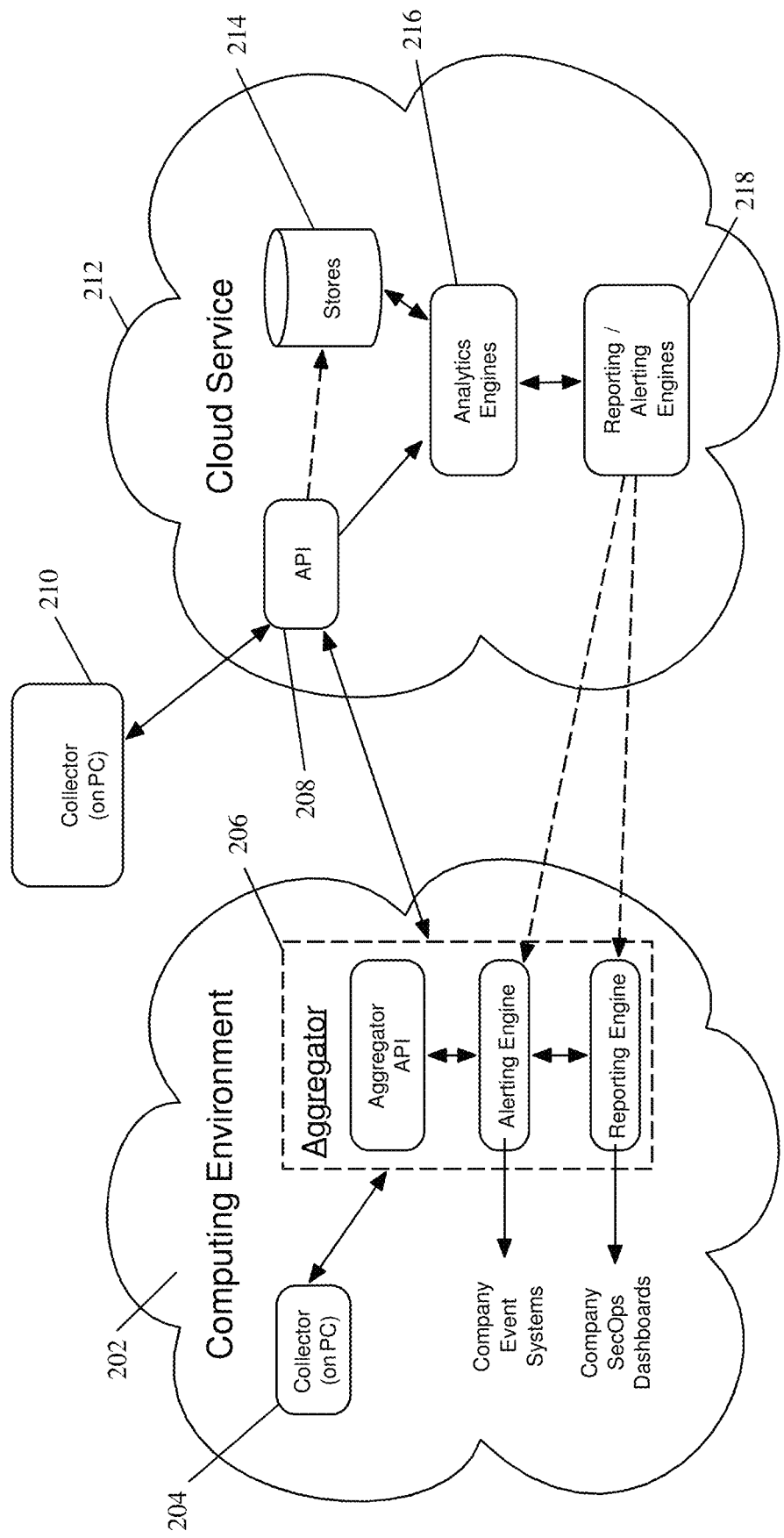
FIG. 2 shows an overview diagram of a system implementing in a corporate computing environment according to one embodiment of the invention.

As shown in FIG. 2, which illustrates an overview diagram of a system implementing in a corporate computing environment according to one embodiment of the invention. In FIG. 2, computing environment 202 generally includes 10's or 100's of thousands of employees. A "Collector" service and agent 204 are installed on the endpoint. The Collector 204 gathers statistical information, and produces a secured data "bundle" which it sends to the Aggregator 206 (in large corporate environments) or directly to the Cloud Service API 208 (if it is a standalone endpoint 210 on the Internet).

Once the data is received by Cloud Service 212, it is unpacked, stored in storage 214 (e.g., random access memory (RAM), hard disk, or solid state drive (SSD)) and passed through the behavioral and metrics analytics engines 216. Analytics engines 216 contain the behavioral analytics rules and learning systems that can differentiate between the activity of different users, including attackers and malware attempting to emulate valid activity. Analytics engines 216 also provide the output required by the reporting and alerting engines 218 to update status and escalate observed potential threats for further investigation. Behavioral and analytics rules are different from one another. Behavioral rules look at context in the activity, while analytics rules are more statistical and arbitrary. For example, a behavioral rule can look at the probability that a sequence of events occurs using only the first/2/3/4 events as the starting point. An analytic rule may look at the metric directly, and ask (for example) "is the CPU load currently within acceptable tolerances given what is currently running?". Both of these are overlaid with a learning system that takes the manual/defined rules and supervises a learning process so that such analysis can be more usefully automated and developed/evolved.

Rules

A related analytic rule might ask: is the CPU load appropriate given the number and types of processes operating in comparison to the expected load that is "normal" (i.e. baseline) for this user. This means there are no set thresholds, and instead the rule looks to identify how extreme deviations are from "normal". If CPU is normally 5%, then moving to 7% may be a significant deviation for one endpoint, but minimal or no deviation for a different endpoint. Generally, no arbitrary thresholds are ever set. Each endpoint has baselines and measurements taken based on deviations. Since the system can operate with no initial values depending on how active the endpoint is, there can be a period of delayed detection (not "protection") while the service sets the baseline, which may require a few days of reasonable activity. Overall, the methods are implemented to measure deviations at a metric, context, sequence, and profile level (i.e. deviations on the endpoint itself), and then across endpoints in a single company/enterprise, and then across all endpoints being monitored.

In general, a behavioral rule can be any sequence or grouping of analyzed contexts that demonstrate sufficient/significant deviation from expected "normal" baselines. Therefore, a sequence or group of events might contain for example 15 metrics or "triggers". Any sub-sequence within the group can be sufficient to increase the probability of abnormal behavior. For example, of 15 metrics in a sequence/group, on one endpoint there might be deviations on metrics contexts 8-12, while on another endpoint there might be deviations detected on metric contexts 3-7. The same behavioral rule is applied, but the probabilities and therefore prediction differ per endpoint in the application of the rule. Note that these operations have different parameters from endpoint to endpoint.

Learning Systems

While the learning systems can operate using conventional Supervised Machine Learning (SML) or Machine Learning (ML) techniques, in one embodiment, the learning systems do not use the existence of metrics or their values to identify breaches (since that is how a signature-based system operates). Instead, the learning systems identify the "switch" between metrics, as they change context, and compare against a baseline of predicted metric behavior.

Assume that there is an analytic sequence (or series of contexts) that could be analyzed effectively by the ML. For example, objects that include one or more metrics may be provided to the ML as inputs of an analytic sequence. In one embodiment, one or more outputs of the analytic sequence may form objects that are provided to the ML as inputs of another analytic sequence.

Every metric can be an initial/starting point for analysis. Each of those metrics can have specific parameters, generally relating to an acceptable range (or scale). For example, "CPU load" can only have values from 0-100, while "Memory Footprint" may have values from 0-<unknown>, with a "reasonable" or expected range of 30% to 100%. Similarly, the number of processes running can be 0-<unknown>, and there are no specific parameters for what the values (i.e. names) of those processes are.

These parameters may be important because (for supervised learning to be applicable) there needs to be sufficient training data to represent the possible combinations of all context switches, and not simply the existence of the metrics themselves. While more complex to model, this approach can produce desirable results. It may also be possible to use some variations of reinforcement learning, dimensionality reduction and anomaly detection, and potentially ignore supervised and unsupervised ML completely for the core analytics.

Note that if a malware agent is already installed on an endpoint when software in accordance with aspects of the invention is first installed, it may initially create a false baseline. Activity related to existing malware may initially appear as "normal" if it is continually active. In such cases, it can take longer to profile and the end result is likely that it will appear as though multiple users are on the endpoint. Some types of malware are naturally very stealthy (particularly those that wait for instructions from "command and control" systems). These will still be detected, when they suddenly wake up and become active.

Collector/Aggregator

Figure 3:
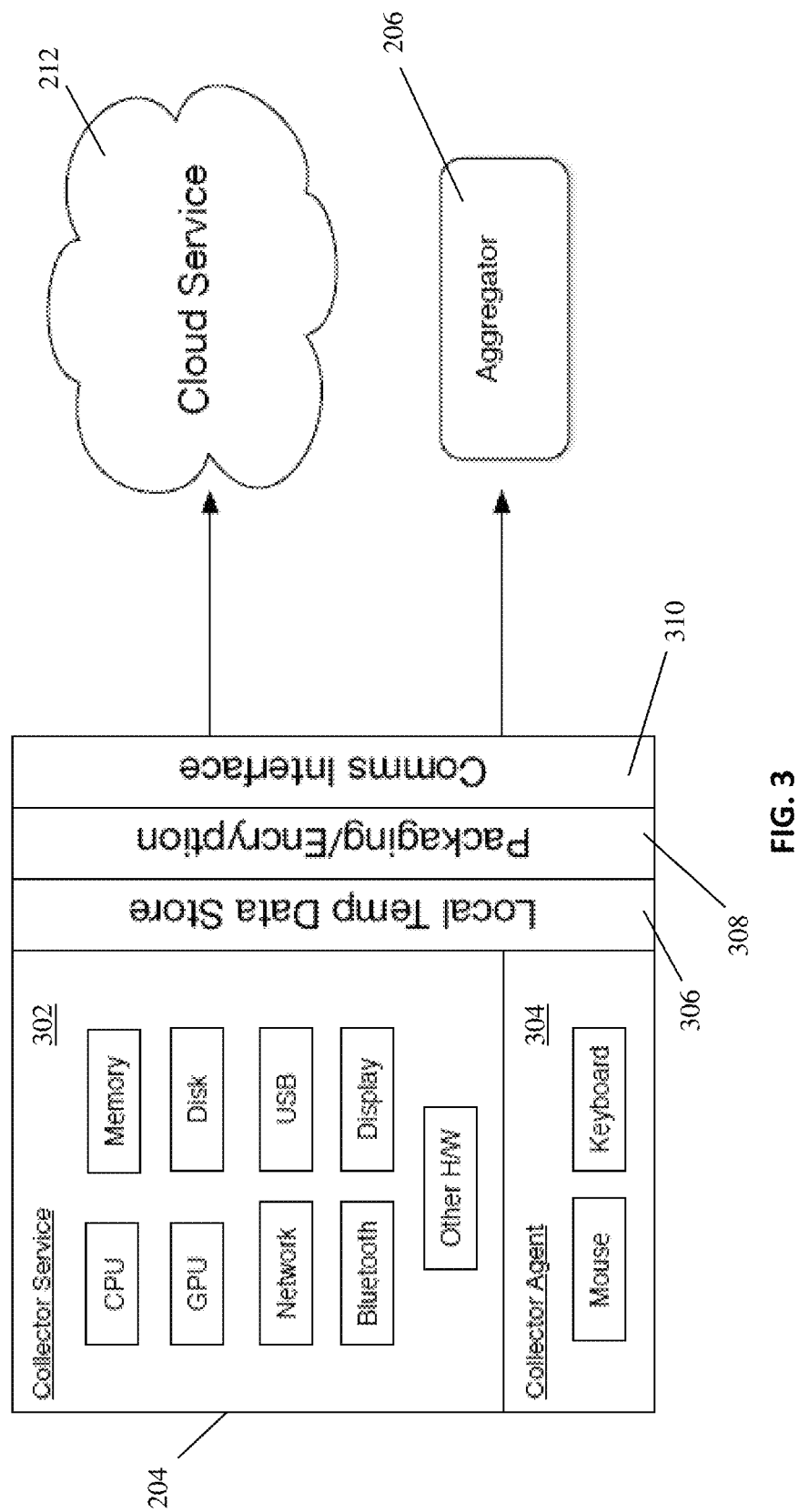
FIG. 3 shows an overview of a collector and an aggregator implemented on an endpoint in a corporate computing environment according to one embodiment of the invention.

FIG. 3 shows an overview of a collector and an aggregator implemented on an endpoint in a corporate computing environment according to one embodiment of the invention. As shown in FIG. 3, the Collector 204 may be a combination of Collector Service 302 (e.g., operating system service/daemon) and Collector Agent 304. The Collector Service 302 receives activity events directly from the operating system, and also takes regular snapshots of hardware-related statistics (e.g., resource information), such as CPU, memory, GPU, disk, Network, universal serial bus (USB), Bluetooth, Display status, and other hardware connections. The Collector Agent 304 allows snapshots to be taken of other activity that occurs in "user space" such as mouse and keyboard activity. The snapshot timing varies depending on the type of data being collected. Activity for highly volatile systems (such as a CPU) might be captured every few seconds, while less active subsystems systems such as Bluetooth might only have data collected every 30 seconds. Event data sent directly from the operating system is not linked to a timer, and is received by the Collector Agent when the events occur.

One goal is that these services and agents are very lightweight, for one exemplary implementation requiring only 20 MB of memory to run and using less than 2% of CPU runtime during the milliseconds required each time to gather the required data.

The statistics collected by the Service 302 and Agent 304 may be represented by the metrics (as previously described). The metrics stored in a small local data store 306 temporarily until a bundle can be built. Each data bundle is sent either to the internal Aggregator or direct to the Cloud Service. The data bundles are highly compressed 308 as the data is statistical only and then encrypted. The data is then transmitted 310 to the Analytics engines on the Cloud Service 212 to identify anomalous behaviors suggesting a breach.

The Aggregator 206 is simply a data handling platform required by many large corporate environments to reduce complexity and assist with enforcing corporate policies that prevent endpoints from accessing the Internet directly. In these cases, the company can permit the aggregator to access the Internet and act as the intermediary between the endpoint Collectors 204 and the Cloud Service API 208.

The Aggregator also performs data management functions relating to alerting and reporting, specifically to reduce the need for internal systems to access the Internet directly. Using the Aggregator allows network and security operations personnel to access reporting information without needing to significantly modify their existing systems.

Cloud Service Data Flow

Figure 4:
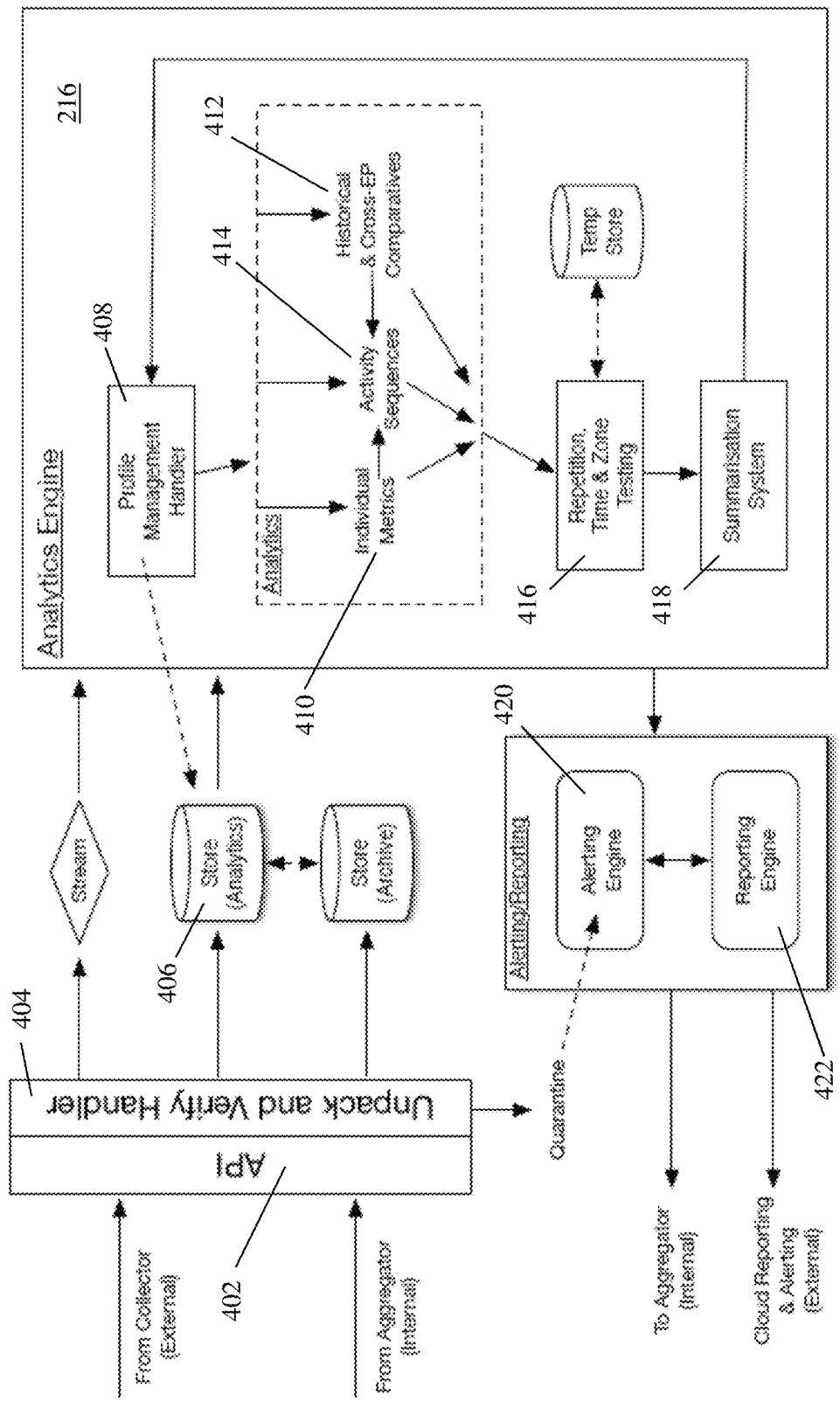
FIG. 4 shows a dataflow diagram for a cloud service according to one embodiment of the invention.

FIG. 4 shows a dataflow diagram for a cloud service according to one embodiment of the invention. Referring to FIG. 4, the cloud service provides the ability to deeply analyze disparate data sets, identify patterns and behaviors not readily visible inside a single enterprise, and remove the processing load from the endpoint to avoid impacting user experience. The enterprise can be the entire organization/company, or it can also refer to a division, department, or business unit inside the organization/company. Therefore, a single enterprise is the collection of users and endpoints that operate as a cohesive and integrated unit, either as the superset that is the entire organization, or a subset. Note also that the emphasis can also be placed on "inside"—many existing technologies are based on a design assumption that breach activity only occurs inside the corporate network perimeter. It is also taken into account that breaches happen wherever the user and endpoint is operating, including out on the Internet, outside the protection of the traditional enterprise network. Also, by residing in the Cloud and not within the enterprise system itself, cloud service and analytics engines 216 are more immune to malicious attack.

Data bundles from the Collectors are received by the Cloud Service API 402, unpacked and verified 404 (and quarantined/alerted if issues are identified) before the data is stored in analytics storage 406 (e.g., RAM, hard disk, SSD) and forwarded into the analytics engines 216 via the Profile Management Handler (PMH) 408. The PMH simply matches historical data with the current data to enhance the analytics effectiveness (i.e. individual data bundles are not useful without historical context). An easy test for each data bundle received is a check to see if it is within tolerances for the historical profile (i.e. is it significantly different from expected). The data bundles are very small, so continually matching received data against stored profile data enhances analytics because it reduces processing load and time once actual analytics starts. Also, it assists with verifying consistency (probability) and also being an early warning to possible integrity or error issues.

Data is then delivered to the analytics engines that have 3 core functions individually, and jointly:

Individual Metrics 410 are sanity checked. It may be possible to identify unauthorized activity or behavior indicating compromise where the activity is not particularly obfuscated or subtle. For example, known malware executables can be identified at this stage. Refer to Table 1 for metrics examples.

Historical and Cross Endpoint (EP) Comparatives 412 use historical data combined with analytics from all endpoints to identify patterns that may exist across the enterprise populations.

Activity Sequences 414 specifically look for valid and authorized behaviors that individually are not an indicator of compromise. However, when contextually joined together into sequence combinations, and analyzed in combination with other metrics (time/timing, zone, and the ABSENCE of specific metrics that would suggest the right user is not present), it is possible to clearly separate and prioritize behaviors that warrant further logging, monitoring and flag for potential escalation. Detecting the absence of a metric is important because current intrusion detection technologies find it difficult assess risk through missing data. In one embodiment, a Prediction Engine may be included to predict—with a determined probability—valid software activity through usual prior activity. The most common absences are technologies implemented by the operating system or other 3rd party vendors that are present all the time in normal operation and suddenly disappear. For example, if Windows Defender, or a 3rd party anti-virus technology, is notably absent (disabled/not operating) while other contextual metrics are flagged as deviating from normal, the absence of a commonly/usually present metric increases the risk associated with the contextual sequence and abnormal behavior probability prediction.

Once the results are produced by the analytics engines, they are compared against a variety of tests 416 that include:

a) Repetition tests—determine if have these behaviors been seen before.

b) Time and timing tests—determine what time of the day an activity is occurring, and the timing of the activity (i.e. how fast/slow it is occurring, and over what period of time).

c) Zone tests—determine where the behavior is occurring, from network zone through to geographic zone.

Alerting and Escalated Alerting

The Alerting Engine 420 is responsible for injecting alerts directly into the existing enterprise alert management or ticketing systems. Alerts are not delivered to the individual endpoint/user (who could be an attacker), although alerts are made available on the Reporting Dashboard and can be easily delivered to security administrators using a method and format the customer prefers (for example: email or text). If an endpoint is potentially being used by a real person who is not authorized, or by a real person who is authorized but behaving abnormally, it is important that the particular endpoint not receive an alert, and that the enterprise administrator responsible for security is alerted as soon as possible.

The alerting and reporting engine designs are also leveraged to implement escalated alerting. Other technologies usually only use generic thresholds or tolerances to generate alerts, much like legacy signature detection systems (i.e. "all or nothing"). The effectiveness of Security Incident and Event Monitoring (STEM) systems can be impacted by poor (or no) tuning. The failure lies in not building these systems to dynamically adapt their ability to capture and alert in an effective way in an automated fashion using the data provided, that produces useful alerts to network and security administrators.

Escalated alerting design is based on the concept of "additive indicators of breach". Tied directly into the design of the Activity Sequences, it is possible to identify varying trigger types and associated level of significance (risk) in order to determine the level of alert that should be generated. Consider the following Behavioral Sequence example from Behavior Sequence Example 2, where each risk trigger adds an additional risk level (level of significance) to a cumulative risk level for the activity sequence/grouping:

A user wakes up their computer (endpoint) from sleep/screensaver using a different sequence of key press or mouse movement than expected (trigger B1). They log in to the endpoint using valid credentials but the timing of keypresses along with mouse movement, while valid, is different to expected (trigger B2). The user then plugs in a USB device, that is valid but infrequent (trigger B3), and then starts typing at a speed impossible for a human (trigger B4) with perfect accuracy (trigger B5). Their typing includes opening of infrequent or never before used applications (trigger B6) that were called by keyboard shortcuts rather than mouse selections when the user historically uses only the mouse to open apps (trigger B7). Those opened applications commence attempting to connect to external (web) systems (trigger B8) that are not in the same GeoIP range as the endpoint (trigger B9) as well as internal hosts by IP address sequence (like a port scan—trigger B10), resulting in a change in port maps, network traffic ratio, disk and CPU utilization (triggers B11, B12, B13 and B14).

The above example would look valid to the vast majority of endpoint breach detection technologies, particularly since the above could occur without malware involved.

Centralized SIEM systems may detect parts of the activity (such as GeoIP connections or scanning of the internal network) from event logs produced by the operating system or monitoring of centralized network switch equipment. However, based on an incomplete picture, these systems would either alert with insufficient information (creating noise or false positives), or not alert at all. Contextual activity may be tracked over a period of time, and adds a risk value for each incremental risk level traversed to the cumulative total risk level determined previously. Some incremental risk levels would also be weighted more heavily than others (for example, trigger B4 in this example is more significant than trigger B7).

While it is possible to set weightings as static values, in one embodiment, weights may be dynamically determined based on at least two main criteria—frequency in prior history (ie has it ever seen before on this endpoint, and how many times); and existence/frequency within the same organization (i.e. are other endpoints in the same network experiencing the same/similar activity. It is possible to weight some categories higher than others. For example, a metric indicating that anti-virus services have been disabled is more interesting (and a higher risk) than observing a change in network traffic volume.

Since administrators historically are not especially skilled at quantifying risk, incremental risk levels and weighting are preferred to be learned over time, based on contextual sequences and relative to a "normal" baseline. In the preferred embodiment, there are no pre-set thresholds with respect to each category of trigger event. For each category of trigger event (each context), a baseline is continually established and dynamically updated over time. Excursions are observed with respect to the baseline, and it is abnormal excursions that cause a trigger. One embodiment looks for excursions of, for example, 1 or 2 standard deviations in either direction. However, for a preferred embodiment, variances are compared across a sequence or group of contexts, and are not relied on individually. Therefore, a single context "step" that moves by more than 1-2 standard deviations may not be enough to trigger unless there are also notable variances in other "steps" in the sequence. In this way, the variances are not aggregated like traditional systems, but are more accurately defined as "dependencies" where multiple variances will be required. In a further embodiment, variances/deviations must also occur in a particular order of context switches to trigger an alert. This will also have the effect of further reducing false positives.

For one embodiment, a function of the Alerting Engine may include receiving authorized user confirmation that the detected activity is actually valid. Examples include cases where an authorized user has a support resource operating their endpoint for support purposes, or where the authorized user has an injury that might change their keyboard or mouse styles. In such cases, the activity will still continue to be tracked and the endpoint would appear on the enterprise security dashboard, but no alert would be sent if the authorized user successfully answers a challenge sent "out of band" (OoB). Such challenges can be by SMS (text, etc.), or using a phone-based authentication system (like Google Authenticator or similar). If the user successfully enters the OoB challenge, then monitoring would continue but alerting would not occur. If the challenge is failed, or not entered at all, an alert would be generated immediately above all other metrics. For a preferred embodiment of this function alerts are sent to the user, but via the reporting and alerting dashboard where security administrators are involved, in order to avoid alerting an attacker or allowing an attacker to continue destructive activity.

Reporting

Reporting is critical as Early Alerting of an organization to a new threat may prevent major damage. Some threats nibble-away at an organization over long periods of time while others, if allowed, capture or corrupt sensitive information or inflict financial damage in very short time periods.

The reporting engine 422 is designed to produce output in predefined formats that can be delivered to existing enterprise monitoring and reporting systems, in addition to providing a direct cloud-based reporting dashboard for clients without existing systems.

Dashboard reporting can be basic or advanced. Basic reporting allows for investigation of events on specific Collectors while also highlighting general statistics about metrics and alerts. Advanced reporting allows companies to investigate events and alerts all the way to source data, as well as review historical analysis.

Examples of Behavioral Activity Groupings

Behavioral analytics and detection technology identifies groups or sequences of valid events or activities that, in isolation, are authorized and permitted. However, when performed together in particular ways can represent a security incident or breach.

Embodiments according to the invention are not intended to be a replacement for legacy or existing technologies such as anti-malware or SIEM, which already serve an important function inside corporate networks. Instead, an additional technology is provided, specifically addressing a design and implementation gap—breaches from insiders (disgruntled or ex-employees), and external actors with stolen credentials, are difficult to detect when their only activities mirror or mimic the real and authorized users.

The examples outlined below are real scenarios that have either been used in successful breaches, or used by security testing consultants to gain access to networks and test defenses. These methods are generally successful without detection by most existing and legacy security technologies. This is not a complete list, but are representative of the types of attacks that have the highest rate of success. Depending on the weightings of each trigger event within a grouping, an alert may be triggered without all the events in a group occurring if the trigger events that cause the alert are weighted heavily enough. For example, if a sub-group of events, say 3 or 4 out the of 8 trigger events in a group, are weighted much heavily than the others in the group, an alert may be generated by variability within just this sub-group of events.

As discussed above, each of the events in an access scenario by users is provided risk weightage based on their importance by the analytics engines. The cumulative weight of events, that are dependencies and show variances from the normal finger print of the user, including deletion/omission, addition and changes, are considered trigger events and are used for enabling a trigger initiation by the analytics engine. When the total weight (cumulative total risk level) of the dependencies identified cross an alert level risk threshold, intimation is provided to reporting/alerting engines for threat alert generation. Note that it is preferred that the alert level risk threshold is established by a learning process over time based on tracked excursions of the cumulative total risk level.

Behavioral Activity Generating Trigger Group 1 [Example 1]—Remote Desktop Connection with Stolen Credentials:

The scenario—Attackers, using stolen credentials obtained from phishing attacks or through dictionary/brute forcing password guessing, will scan corporate external perimeters looking for remote access gateways. Once identified, access is generally straight forward.

Attacker establishes remote desktop connection with target gateway and is presented with login screen (trigger A1, new source address). Attacker may move mouse to verify connection or put the cursor in the username field (trigger A2). Attacker types stolen username/password differently to the real user (trigger A3) or copy/pastes credentials (trigger A4). Once logged into remote desktop, attacker will usually adopt keyboard shortcuts which are faster than mouse movements (trigger A5), or will open CMD/terminal (trigger A6) to execute scripts (trigger A7) that were created using copy/paste (trigger A8) onto a local hidden or temporary directory (trigger 9). Attacker may also download tools (trigger A10) and install tools to ensure endpoint remains accessible across reboots (trigger A11).

From here, the attacker's movements, laterally across the network, can trigger several metrics depending on their objective. Data theft can change the network and disk profiles; software installation can change the firewall, network and connection tables as well as disk, memory and CPU profiles; scanning or connections to internal systems can change the transmit/receive ratios and connection tables. Mouse and keyboard analytics would also highlight issues where the attacker is manually operating the endpoint, or the endpoint is being controlled by an automated system (bot) that does not behave naturally (large number of triggers, and trigger sequences).

Behavioral Activity Generating Trigger Group 2 [Example 2]—Insider Access with Stolen Credentials, or Endpoint Left Unlocked:

The scenario—A user (disgruntled, bribed, contractor) wishes to either steal sensitive data or deliver malware that allows remote connection at a later time. The user does not want to be detected and therefore uses stolen credentials, or takes advantage of an unprotected unlocked endpoint.

A user wakes up the computer (endpoint) from sleep/screensaver using a different sequence of key presses or mouse movement than expected (trigger B1). They log in to the endpoint using valid credentials but the timing of keypresses along with mouse movement, while valid, is different to expected (trigger B2). Or, identifying an unlocked endpoint, user moves the mouse differently to the real user (trigger B3) or uses keyboard shortcuts to open known menus or applications (trigger B4). Unfamiliar with desktop layout or available applications, unauthorized users will either use the mouse to browse menu options (trigger B5); use the search function to quickly locate specific applications (trigger B6); or open a CMD/terminal to directly access the filesystem (trigger B7).

Similar to Example 1, the attacker's movements, laterally across the network, can trigger a number of metrics depending on their objective. Data theft can change the network and disk profiles; software installation can change the firewall, network and connection tables as well as disk, memory and CPU profiles; scanning or connections to internal systems can change the transmit/receive ratios and connection tables (large number of triggers, and trigger sequences).

Behavioral Activity Generating Trigger Group 3 [Example 3]—USB Device Inserted and Subsequent Commands The scenario—A user (disgruntled, bribed, contractor) wishes to either steal sensitive data or deliver malware that allows remote connection at a later time but has limited time and therefore automates the attack using a USB device. Alternatively, user finds a USB device in the carpark and decides it can't hurt to test on the work computer.

A user wakes up the computer (endpoint) from sleep/screensaver using a different sequence of key press or mouse movement than expected (trigger C1). They log in to the endpoint using valid credentials but the timing of keypresses along with mouse movement, while valid, is different to expected (trigger C2). The user then plugs in a USB device, that is valid action but infrequent (trigger C3), and then starts typing at a speed impossible for a human (trigger C4) with perfect accuracy (trigger C5). Their typing includes opening of infrequent or never before used applications (trigger C6) that were called by keyboard shortcuts rather than mouse selections when the user historically uses only the mouse to open apps (trigger C7). Those opened applications commence attempting to connect to external (web) systems (trigger C8) that are not in the same GeoIP range as the endpoint (trigger C9) as well as internal hosts by IP address sequence (like a port scan—trigger C10), resulting in a change in portmap, network traffic ratio, disk and CPU utilization (triggers C11, C12, C13 and C14).

Behavioral Activity Generating Trigger Group 4 [Example 4]—Attach to Privileged Process with Reverse Shell Access The Scenario—Most common with remote attacks, the attacker is highly motivated to establish persistence on the target endpoint, so that they can continue to gain access in future. Attaching to a privileged process allows the attacker to still connect to an endpoint even after it has been rebooted.

Generally, the easiest way for an attacker to gain remote access to an endpoint is through phishing or similar attacks. Other options also exist, and the end result is the same—the attacker is able to get a remote connection to the endpoint. Detected triggers are likely provided in the initial stages of the phishing attack (such as the installation of malware that results in automated installation of tools/droppers and automated (bot) connections back to the breached endpoint). This example covers the scenario after the endpoint has initially been remotely breached and the attacker connects for the first time (i.e. it is not simply a malware infected endpoint operating as a bot).

Initial connections in this scenario are unlikely to be graphical (i.e. not remote desktop). Attackers will have "shell" access, which is command-based access to enter instructions (i.e. typing only, with only text as the interface). Depending on the shell access method used (trigger D1), visibility of the commands being entered may or may not be provided (and therefore of the keyboard metrics—trigger D2 if they are visible, trigger D3 if the keystrokes are not visible but user-interactive commands are being executed). The attacker will initiate a series of activities to identify the endpoint (trigger D4), understand the filesystem layout (trigger D5), identify network connections to file servers and other potential targets (trigger D6) and identify privilege level of the user they are pretending to be (trigger D7).

The attacker can then undertake a variety of very small activities that will take advantage of a weakness or vulnerability in the endpoint (trigger D8). This is common if the endpoint is not fully patched and updated (operating system) or has unpatched applications installed. Exploiting these vulnerabilities may require small exploit tools to be uploaded to a local temporary directory (trigger D9) or custom code written on the endpoint to be executed (trigger D10) usually after downloading code or content from external sources without using a browser (trigger D11).

Execution of the attacker's code will exploit the vulnerability and allow the attacker to attach their code to a privileged process. This code most often takes the form of a "reverse shell". These are CMD/terminal sessions where the breached endpoint makes a new outbound connection to the attacker's Bot network every time the endpoint is rebooted. Such a process changes various metrics on the endpoint, including network (connection) tables, network activity ratios, CPU and memory footprints, etc. There are numerous triggers that would combine in this scenario to identify a particularly stealthy attacker who has not done anything that would be detected by existing anti-malware or other security systems.

This example is broadly similar to the challenge given to a security tester when evaluating detection technology. Embodiments according to the invention would detect the attacker as they exploited the endpoint and attacked other endpoints, while legacy technologies would not.

Individual Metrics

Metrics may be defined by a broad category, and may be identifiable within a given platform or operating system on an endpoint, or are a combination of values taken from a variety of sources. The exemplary and non-limiting list below highlights some of the common categories and metric types, but has been generalized and is not to be taken as a complete source or reference.

TABLE 1

Examples of Metrics

| Category | Metric |
| --- | --- |
| Firewall | Application; direction; IP address and port; sub- application (child and thread) |
| Process Info (CPU) | Process name; process ID (PID); operator; volatility; process creation and destruction events |

TABLE 1-continued

Examples of Metrics

| Category | Metric |
| --- | --- |
| GPU | Load; display state; duration |
| Memory | Memory map and size; volatility |
| IP Address (Network) | Local address and port; remote address and port; session state; related process ID (PID); GeoIP of remote addresses; resolved domains with historical tracking |
| Activity Counter (Network) | Packets sent; bytes sent; bytes received; bytes total |
| Port Info (Network) | Port count; session states; inbound/outbound ratio; GeoIP of source/destination; volatility |
| User | Account name; user flags; operator |
| Groups & Membership | Group names; member name; member group name |
| Applications - privileged | State; in use; |
| Applications - user | State; in use; |
| Keyboard | Keys per minute; backspace/delete per minute; control keys per minute; timing between keys; timing between common and defined sequences |
| Mouse | Movement duration; movement commencement duration; movement acceleration duration; movement deceleration duration; movement dwell before stop; movement dwell before button press; duration between button press; button presses per minute; |
| Display | State; duration |
| USB | State; activity |
| Bluetooth | State; activity |
| Other hardware | State; activity |

Overall Process Flow

Figure 5:
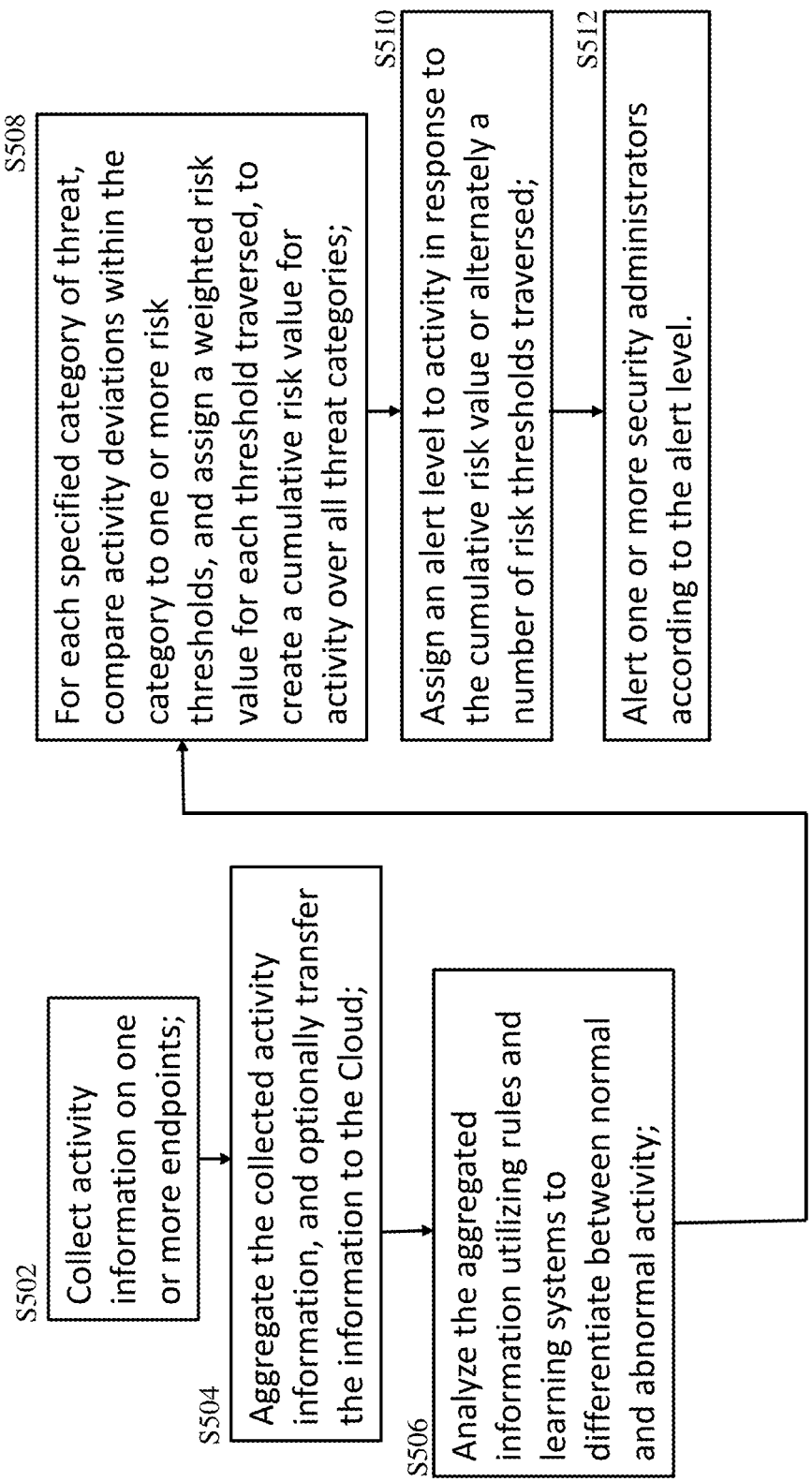
FIG. 5 shows a flow diagram of a process for threat detection according to one embodiment of the invention.

FIG. 5 shows a flow diagram of a process for threat detection according to one embodiment of the invention. In step S502, activity information is collected on one or more endpoints. In step 504 the collected activity information is aggregated, and optionally transferred to the cloud (e.g., over a network) in order to be processed in a more secure environment. In step S506, the aggregated information is analyzed using rules and learning systems to differentiate between normal and abnormal activity. In step S508, for each specified category of threat, activity deviations are compared within the category to one or more risk thresholds, and a weighted risk value is assigned for each threshold traversed, to create a cumulative risk value for activity over all threat categories within a specified time period. In step S510, an alert level is assigned to activity in response to the cumulative risk value being compared with an alert level risk threshold or alternately in response to a number of risk thresholds traversed. Last, in step S512 one or more security administrators are alerted according to the alert level.

Critical, time sensitive alerts to threats that may place the computer system in immediate jeopardy are annotated or provided in such a way as to guarantee system administrators are immediately alerted. For example, a text message may be sent to responsible system administrators from a specific phone number such that an administrator cellular phone can be programmed to respond with a specific and unique tone when an extremely time critical alert is generated.

User Interface Dashboard

Figure 6:
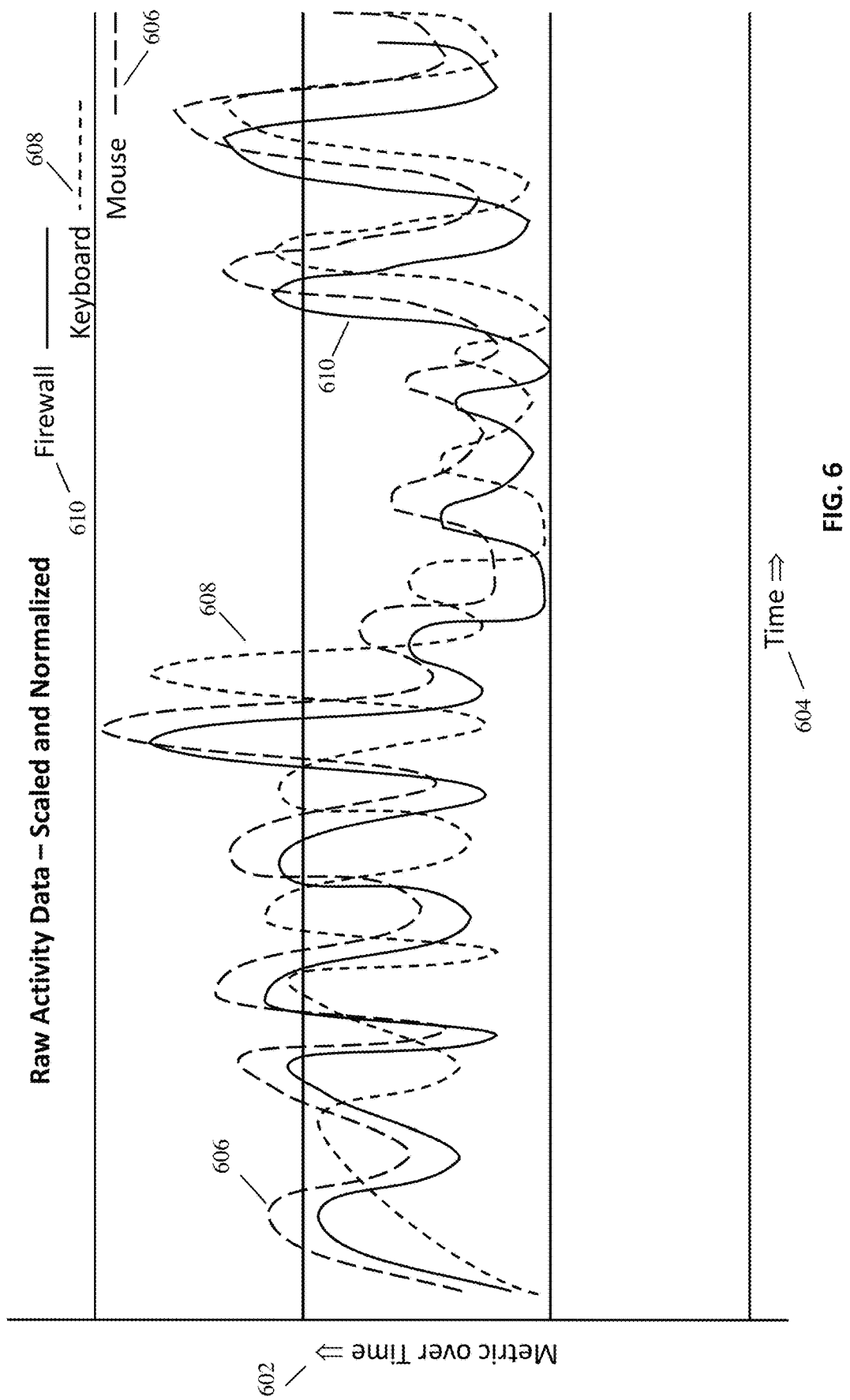
FIG. 6 shows a diagram of raw activity data on an endpoint.

The user interface dashboard is available to security administrators for computer systems where Collector 204 is installed, and provides control of security processes according to aspects of the invention as well as a variety of displays of analytical information and status. Facilities are included to alert security administrators to alerts of varying priorities as well as prominently displaying alerts for high priority identify threats. User activity at endpoints can be viewed in the user interface and a variety of formats. FIG. 6 shows a graph of raw activity data that has been scaled and normalized where amplitudes for metrics 602 are shown over time 604. For example, only three metrics are shown for clarity. These include firewall activity 610, keyboard activity 608 and mouse activity 606. Many additional metrics may also be shown in such a graph including for example: network activity, IP address activity, disk activity, etc. See table 1 for a more comprehensive list of metrics.

Figure 7:
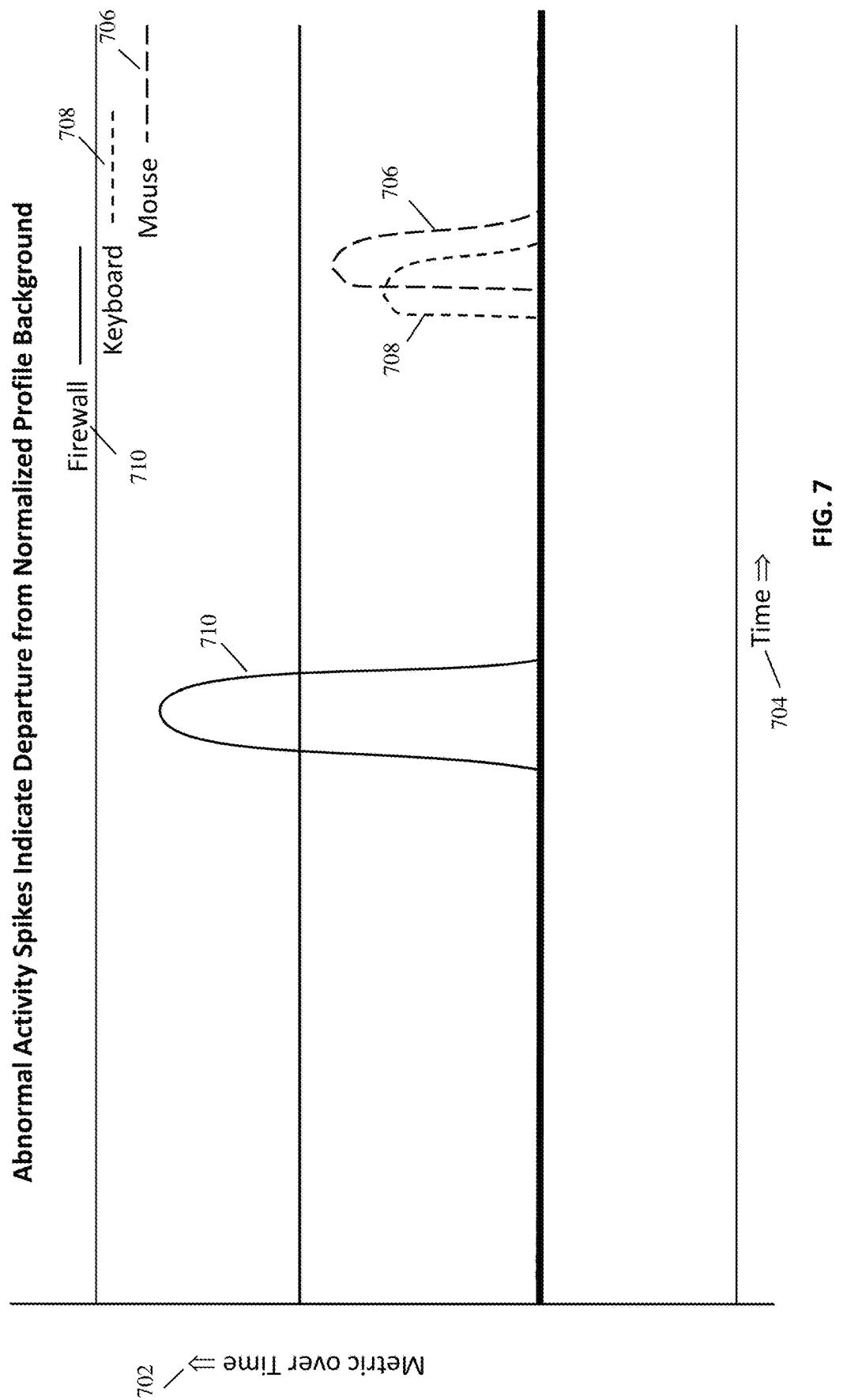
FIG. 7 shows a graph indicating activity for specific threat types.

After analysis is been performed, a display such as for example that of FIG. 7 can be viewed. Again, metrics 702 are shown over time 704, except in the graph of FIG. 7 the same metrics shown in raw form for FIG. 6 are now shown as abnormal activity spikes that indicate a departure from a normalized profile background. Spikes 706, 708, and 710 show abnormal activity spikes for mouse, keyboard, and firewall activity respectively.

Figure 8:
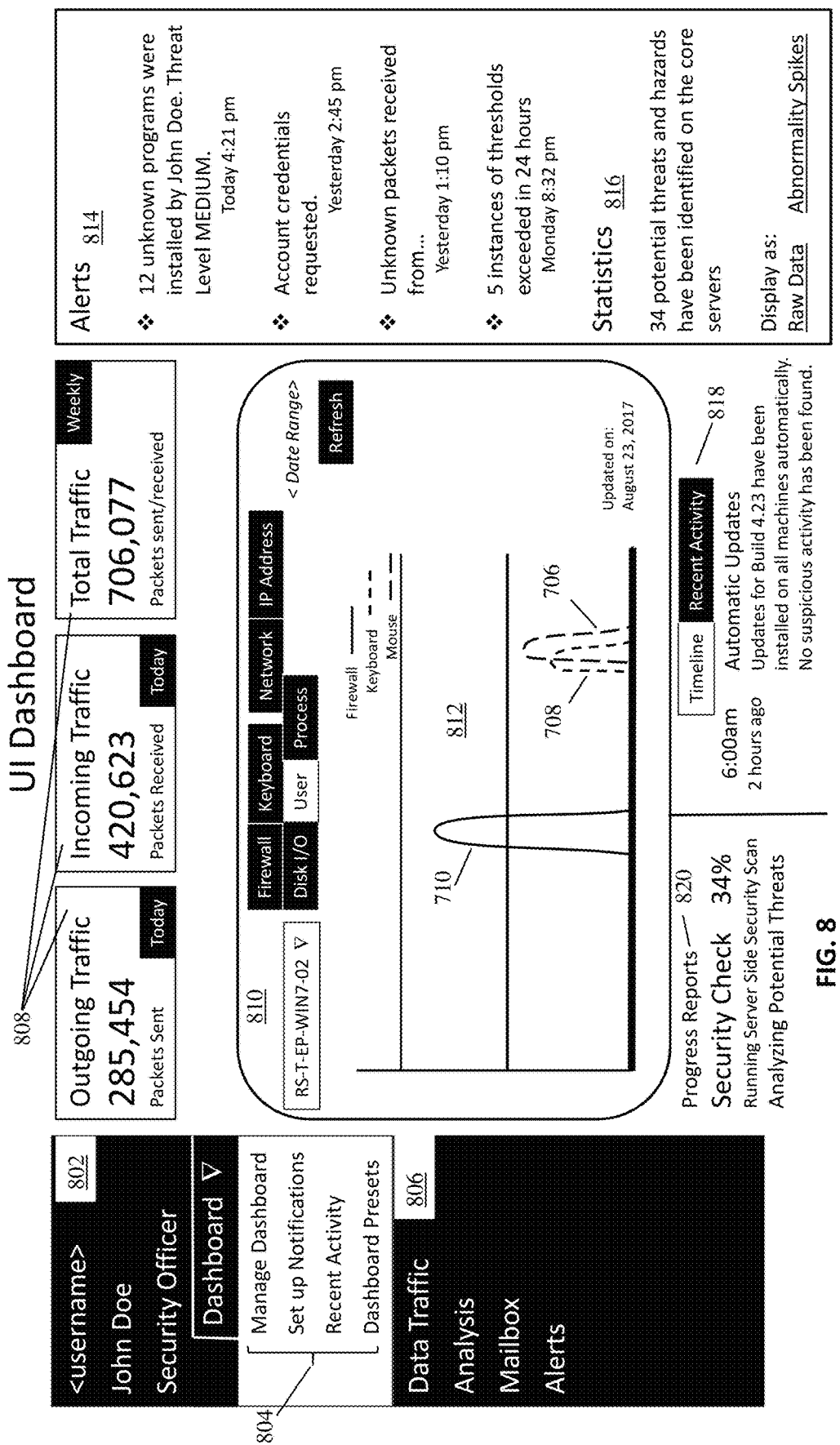
FIG. 8 shows an exemplary user interface (UI) dashboard according to one embodiment of the invention.

FIG. 8 shows an exemplary user interface (UI) dashboard according to one embodiment of the invention. Referring to FIG. 8, in the upper left, a responsible security administrator has signed in and is identified 802. The dashboard may have a multitude of functional modes 804 including: general management of the dashboard; setting up notification; recent activity display; and assignment of dashboard presets. Other functions 806 may be controlled from the dashboard including for example and without limitation data traffic display, analysis display, mailbox access, and display, control, and disposition of alerts. At the top of this exemplary display, data traffic 808 is shown. In the center of the display of FIG. 8, an activity graphic 812 is displayed which in this case has been chosen to display the graph containing abnormal activity spikes as previously shown in FIG. 7. At the right of the display a list of alerts 814 is shown, and under the alerts a summary of statistics 816 is shown. At the bottom of the display recent activity 818 is shown, and also a progress report 820 is shown indicating that a security check is currently 34% complete.

Prediction Engine and Probability Profiles

Endpoints (computers/mobile devices/etc.) are constrained by the technical sequence that is followed when an application program or process starts. Any software application that runs (such as MSWord.exe) must execute several predefined steps in a particular process sequence to function correctly. Along the way, a software process will typically touch certain files or involve other applications. Even malware and attackers are constrained by the technical sequence that endpoint hardware and operating systems must follow for applications to function. One embodiment of the invention, herein called the Prediction Engine, identifies when attackers and/or malware attempt to manipulate such a process. The Prediction Engine predicts the steps that an application would be expected to usually follow—with a determined probability that a process should follow the steps—in the context of the user who normally operates/owns the endpoint. When applications diverge from their predicted sequences, the probability of a possible breach increases. Thus, the Prediction Engine analyzes the effects of user behaviors at an endpoint as well as software execution sequences.

There are scenarios where attacker code or malware can "attach" themselves to an existing process, after the existing process has already passed controls that might exist, such as permission/authorization checks, or establishing a connection with the Internet. This can be viewed as malware or attacker code "hitching a ride" and taking advantage of the authorized application letting them pass through the usual control/security gates.

If a user launches MSWord.exe regularly, there is a pattern that is followed that is recorded by the Prediction Engine. Using that pattern that is seen multiple times in the past tells us that running MSWord.exe is normal for that user, and the associated probability of that pattern is normal. The steps the application follows when starting are well known and well defined. Using this data, the Prediction Engine predicts the steps MSWord.exe is likely to take each time it runs in future, with high probability, and therefore high confidence.

When an application is run, but does not follow the predicted series of steps that the established behavioral model expects, then the probability that this is the same application as seen previously is lower than expected, and therefore may warrant further analysis or an alert to be created. Divergent behavior increases the probability that the application in question has been modified or manipulated, such as when the application has not been patched and contains vulnerabilities that attackers can exploit. This probability is a metric of its own, and can be combined with other metrics to derive an overall risk weighting. Also, current technologies find it difficult to assess risk through missing data. The Prediction Engine predicts valid activity sequences through observation of usual prior activity, and also determines a potential breach by discovering an ABSENSE of activity that with high probability would normally exist.

Figure 9:
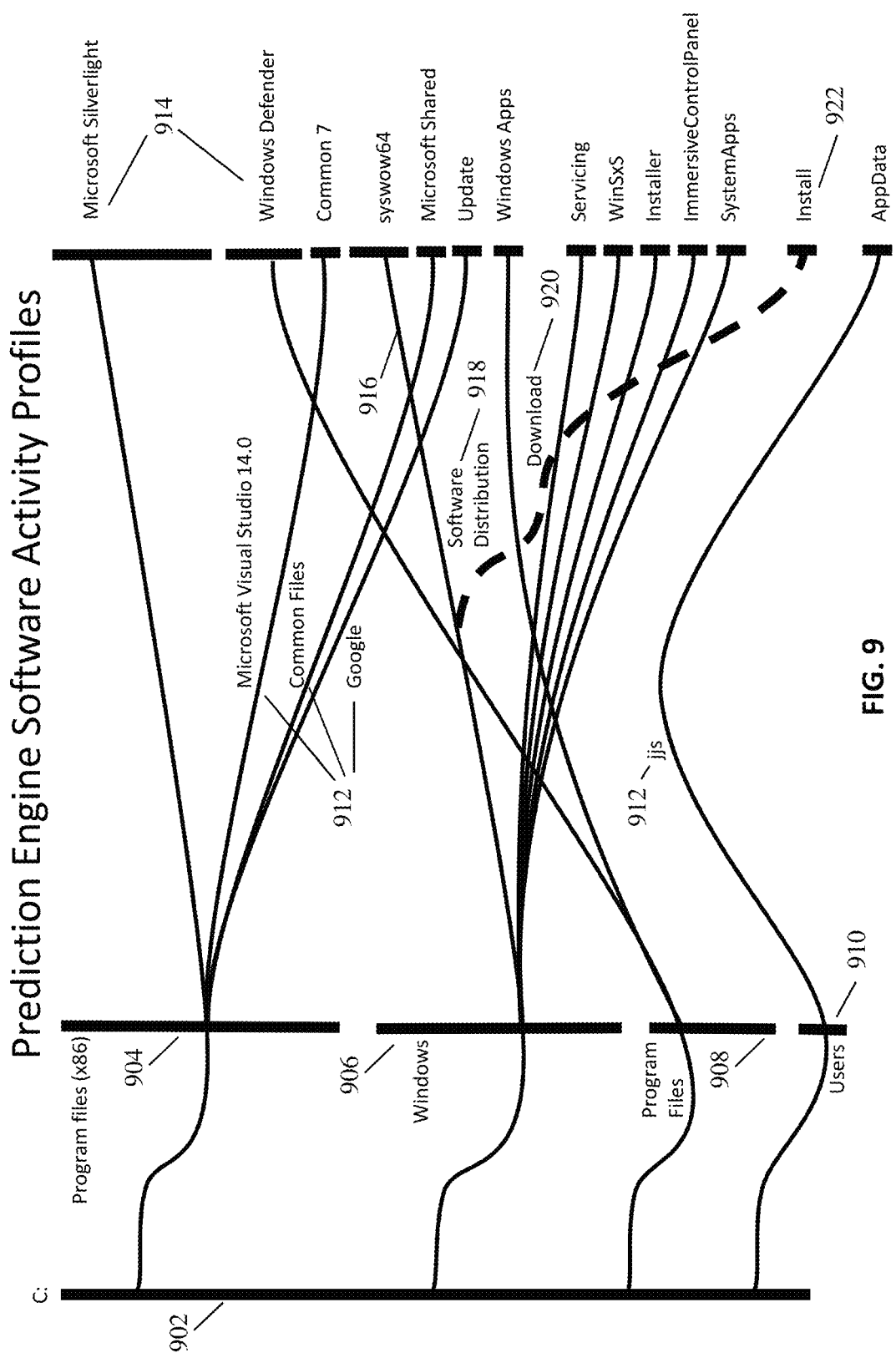
FIG. 9 shows an exemplary diagram of software activity profiles according to one embodiment of the invention.

The graph of FIG. 9 shows expected activity sequences for given software processes that behave as predicted (with high probability) while a divergent process that did not follow the predicted path is highlighted. While the divergent path does not necessarily indicate a breach, it does indicate anomalous behavior that may warrant further investigation, collection of additional metrics, or generating an alert. Analysis may determine to what degree the diversion path is abnormal, and assign a weighted threat level to each successive diversion from the most probable path. In this particular example, programs typically start at a root directory 902 such as C, and then propagate from particular primary directories such as program files (x86) 904, Windows 906, Program Files 908, and Users 910. From there, programs propagate in relatively predictable matters with a probability that is determined over time by the prediction engine, operating various applications 914 such as for instance Microsoft Silverlight and Windows Defender. Some processes will touch 912 different directories or engage with other applications along the way, but typically do so in a predictable manner with an associated probability.

Occasionally a software process such as 916 may divert from a predictable path at a juncture such as 918 were a software distribution function is invoked later causing another diversion where download 920 occurs resulting in installation 922, which in fact may represent an injection of malware code into the system. A threat level is established in a probabilistic manner according to an amount of diversion from a predictable path, as well as the category of functionality that is represented by the diversion. Subsequently alerts are generated in response to elevated threat levels.

Automated tasks and systems which typically operate within an enterprise system may be included with additional processing typically performed in the Cloud to determine as quickly as possible when an attack or unauthorized intrusion has been made. Because the primary enterprise/computer system being protected is generally considered more vulnerable to threats than functionality operating in the Cloud, processes according to aspects of the invention may move activity data to the servers in the Cloud as quickly as possible through the Internet in order to take advantage of this additional safety factor. A critical threat produces a high-priority alert so that responsible system administrators are immediately notified and can act quickly to mitigate potential damage from the identified threat. In one embodiment, security administrators are notified by a text to their cell phone through a cellular infrastructure in order to alert them as quickly as possible and further to provide a unique audible tone that is specifically associated with highly critical alerts.

Figure 10:
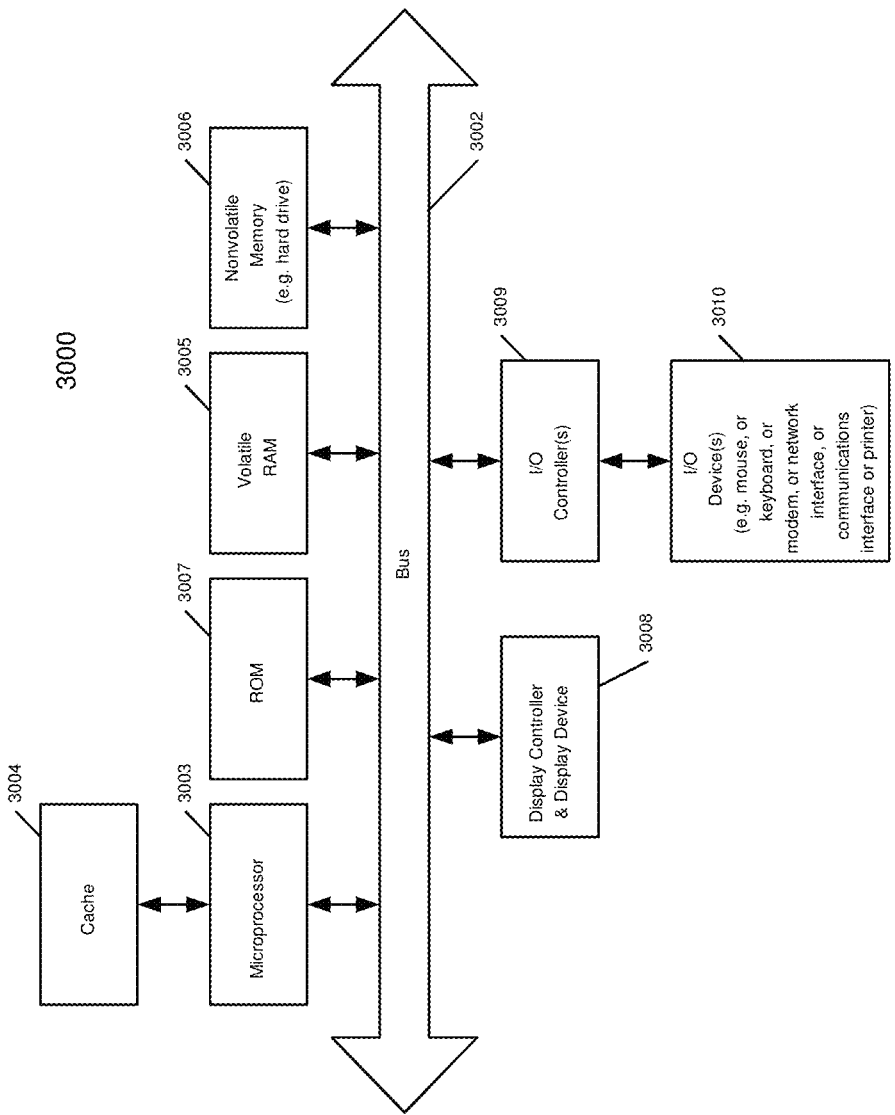
FIG. 10 is a block diagram of a data processing system, which may be used with one embodiment of the invention.

FIG. 10 is a block diagram of a data processing system, which may be used with one embodiment of the invention. For example, the system 3000 may be used as part of the cloud service 212 as shown in FIG. 2. Note that while FIG. 10 illustrates various components of a computer system, it is not intended to represent any particular architecture or manner of interconnecting the components; as such details are not germane to the invention. It will also be appreciated that network computers, handheld computers, mobile devices (e.g., smartphones, tablets) and other data processing systems which have fewer components or perhaps more components may also be used with the invention. The system 3000 of FIG. 10 may, for example, be a client or a server.

As shown in FIG. 10, the system 3000, which is a form of a data processing system, includes a bus or interconnect 3002 which is coupled to one or more microprocessors 3003 and a ROM 3007, a volatile RAM 3005, and a non-volatile memory 3006. The microprocessor 3003 is coupled to cache memory 3004. The bus 3002 interconnects these various components together and also interconnects these components 3003, 3007, 3005, and 3006 to a display controller and display device 3008, as well as to input/output (I/O) devices 3010, which may be mice, keyboards, modems, network interfaces, printers, and other devices which are well-known in the art.

Typically, the input/output devices 3010 are coupled to the system through input/output controllers 3009. The volatile RAM 3005 is typically implemented as dynamic RAM (DRAM) which requires power continuously in order to refresh or maintain the data in the memory. The non-volatile memory 3006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, a non-volatile memory that is remote from the system may be utilized, such as, a network storage device which is coupled to the data processing system through a network interface such as a modem or Ethernet interface. The bus 3002 may include one or more buses connected to each other through various bridges, controllers, and/or adapters, as is well-known in the art. In one embodiment, the I/O controller 3009 includes a Universal Serial Bus (USB) adapter for controlling USB peripherals. Alternatively, I/O controller 3009 may include an IEEE-1394 adapter, also known as FireWire adapter, for controlling FireWire devices.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A cyber security threat detection system for a plurality of system within a computing environment, the system comprising:
a plurality of system endpoints, each system endpoint having a memory and at least one processor coupled to the memory, the at least one processor of the system endpoint being configured to:
take a first snapshot of the system endpoint, the first snapshot having event activity information associated with the system endpoint, and
take a second snapshot of the system endpoint, the second snapshot having behavioral activity information associated with the system endpoint, wherein the first snapshot and the second snapshot of the system endpoint are aggregated into an aggregated snapshot comprising snapshots of the system endpoints; and
a server having a memory and at least one processor coupled to the memory, the at least one processor of the server configured to:
generate and store baseline profiles associated with the system endpoints based on a previously received aggregated snapshot,
receive the aggregated snapshot,
determine deviation values for each of the system endpoints based on the received aggregated snapshot and the stored baseline profiles,
generate, for each of the system endpoints, a cumulative risk value based on the deviation values, and
determine whether to issue one or more alerts indicating one or more security threats have occurred for each of the endpoints in response to the cumulative risk value.

2. The system of claim 1, wherein the at least one processor of the server is further configured to update a stored baseline profile associated with one of the system endpoints based on the received aggregated snapshot if a user associated with the system endpoint is determined to be an approved user.

3. The system of claim 1, wherein the at least one processor of the server is further configured to
predict, for each of the system endpoints, a pattern associated with a software application based on a determined probability and context of a user of the system endpoint, and
determine some of the deviation values for the system endpoint based on the pattern associated with the software application, and to generate a risk value for each of the deviation values.

4. The system of claim 3, wherein the at least one processor of the server is further configured to issue an alert and a report in response to a determination that the cumulative risk value exceeds a risk threshold.

5. The system of claim 1, wherein:
the deviation values are associated with a plurality of categories of threat, each of the categories of threat associated with a specific risk value, and
risk values of some of the categories of threat are weighted differently from risk values of other categories of threat.

6. A method for detecting cyber security threat within a computing environment having a plurality of endpoints, the method comprising:
acquiring, by an endpoint, event activity information and behavioral activity information associated with the endpoint, wherein the event activity information and the behavioral activity information are aggregated into aggregated activity information associated with the endpoint;
receiving, by a server, the aggregated activity information;
comparing, by the server, the aggregated event activity information against a group of activities that represents a baseline profile associated with the endpoint, wherein each activity of the group of activities is associated with a risk value;
determining, by the server, deviation information based on the comparison of the aggregated activity information and the calculated group of activities;
assigning and producing, by the server, risk values for the endpoint based on the deviation information;
generating, by the server, a cumulative risk value based on the produced risk values; and
determining, by the server, whether one or more security threats have occurred for the endpoint based on the cumulative risk value;
wherein determining the deviation information comprises determining, by the server, that a subset of activities in the aggregated activity information diverges from corresponding activities in the group of activities, each activity in the subset causing a trigger indicative of a security or risk event, wherein the subset of activities comprises at least three activities from the group of activities, the group of activities comprising:
a) establishing a remote desktop connection from a remote access gateway to access a login screen of a remote terminal having a new source address,
b) placing a cursor in a user name field to verify connection,
c) invalidly entering a user name and password,
d) using copy and paste to input credentials,
e) adopting use of high speed keyboard shortcuts after logging into the remote terminal, f) opening a command (CMD) terminal on the remote terminal after logging in,
g) inputting scripts by copy and paste into the CMD terminal,
h) executing the scripts within the opened CMD terminal,
i) forming a hidden directory for storing the scripts,
j) downloading an external tool program, and
k) installing the downloaded tools to ensure the endpoint remains accessible across reboots; or
a) using an invalid set of key strokes or mouse movement to wake up the endpoint from a sleep or screensaver state,
b) logging into the endpoint using valid credentials and invalid timed key strokes and mouse movement,
c) once the endpoint is unlocked, invalidly moving a mouse device to open menus or applications,
d) invalidly using key stroke shortcuts to open menus or application programs,
e) browsing menu options associated with a network topology,
f) using search functions to locate specific applications and data locations, and
g) opening a command (CMD) terminal on the endpoint to access file systems on a network; or
a) waking up the endpoint from sleep or screensaver state using an invalid sequence of key press or mouse movement,
b) logging into the endpoint using valid credentials and invalid timing of keypresses and mouse movement,
c) infrequently plugging into the endpoint a universal serial bus (USB) device,
d) emulating typing at an invalid speed,
e) providing data entry with perfect accuracy,
f) inputting data that causes opening of infrequently used applications,
g) opening of applications being initiated significantly more by keyboard shortcuts as opposed to mouse selections,
h) attempting to connect to external systems or web pages,
i) attempting to connect to the external systems that are not in the same GeoIP range as the endpoint,
j) attempting to connect to internal hosts by internet protocol (IP) address sequence,
k) opening an application resulting in a change in port map,
l) opening an application resulting in a change in network traffic ratio,
m) opening an application resulting in a change in disk utilization, and
n) opening an application resulting in a change in central processing unit (CPU) utilization.

7. The method of claim 6, further comprising generating, by the server, a threat alert responsive to the determination that the cumulative risk value exceeds a risk threshold.

8. The method of claim 6, further comprising generating, by the server, a threat alert and a threat report responsive to determining that the cumulative risk value exceeds a risk threshold.

9. The method of claim 6, further comprising comparing, by the server, a software process activity of the endpoint against an established probabilistic pattern of software activity.

10. The method of claim 6, wherein the subset of activities further comprises at least three of the following group of activities that further comprises:
    using a shell access to type when entering instructions, avoiding visibility of commands entered,
    entering invisible commands that are being executed with invisible keyboard metrics,
    invoking an activity that identifies an endpoint for subsequent connections,
    invoking an activity that identifies file systems accessible for the subsequent connections,
    invoking an activity that identifies network connections to file servers and targets for the subsequent connections,
    invoking an activity that identifies a privilege level of a user,
    invoking an activity that leverages an identified weakness or vulnerability in the endpoint,
    invoking an activity that uploads a program into a local temporary directory,
    inputting a custom code in text form, and
    running the custom code over the uploaded program to personalize access conditions.

11. The method of claim 10, wherein running the custom code over the uploaded program to personalize the access conditions enables an attacker or malware to attach to a privileged process.

12. The method of claim 11, wherein the reverse shell privileged process enables the endpoint to form a new outbound connection to an external network every time the endpoint is rebooted, thereby initiating of a cyber security or risk event.

13. The method of claim 12, wherein the external network is a Bot network.

14. The method of claim 6, wherein determining the deviation information further comprises generating, by the server, one or more triggers in response to determining that some activities in the aggregated activity information diverges from corresponding activities in the calculated group of activities.

15. The method of claim 6, wherein assigning and producing the risk values for the endpoint comprise associating, by the server, the risk values with categories of threat, wherein some of the categories of threat are weighted differently from other categories of threat.

16. The method of claim 6, wherein:
    determining deviation information further comprises determining, by the server, whether an activity within the aggregated activity information is absent as compared to a corresponding activity within the calculated group of activities, and
    assigning and producing the risk values for the endpoint comprises associating, by the server, a risk value with the activity in response to determining that the activity is absent.

* * * * *